US012336451B2

(12) United States Patent
Conboy et al.

(10) Patent No.: US 12,336,451 B2
(45) Date of Patent: Jun. 24, 2025

(54) ROW UNIT FOR A SEED-PLANTING IMPLEMENT HAVING A FURROW DEPTH ADJUSTMENT SYSTEM

(71) Applicant: CNH Industrial America LLC, New Holland, PA (US)

(72) Inventors: Michael Christopher Conboy, Chicago, IL (US); Trevor Stanhope, Oak Lawn, IL (US)

(*) Notice: Subject to any disclaimer, the term of this patent is extended or adjusted under 35 U.S.C. 154(b) by 714 days.

(21) Appl. No.: 17/727,140

(22) Filed: Apr. 22, 2022

(65) Prior Publication Data

US 2023/0337574 A1    Oct. 26, 2023

(51) Int. Cl.
| | | |
|---|---|---|
| A01C 7/20 | (2006.01) | |
| A01B 63/00 | (2006.01) | |
| A01C 5/06 | (2006.01) | |
| A01C 7/08 | (2006.01) | |

(52) U.S. Cl.
CPC ............ *A01C 7/203* (2013.01); *A01B 63/008* (2013.01); *A01C 5/064* (2013.01); *A01C 5/068* (2013.01); *A01C 7/08* (2013.01)

(58) Field of Classification Search
CPC ........ A01C 5/064; A01C 7/203; A01B 63/008
See application file for complete search history.

(56) References Cited

U.S. PATENT DOCUMENTS

| | | |
|---|---|---|
| 2,226,000 A | 12/1940 | Kroll et al. |
| 3,420,550 A | 1/1969 | Rau |
| 4,069,774 A | 1/1978 | Lofgren et al. |
| 4,275,670 A * | 6/1981 | Dreyer .................... A01C 5/068 111/926 |
| 4,356,780 A * | 11/1982 | Bauman .................. A01C 5/064 172/395 |

(Continued)

FOREIGN PATENT DOCUMENTS

| | | |
|---|---|---|
| CN | 104255126 | 3/2016 |
| EP | 2449870 B1 | 10/2013 |

(Continued)

OTHER PUBLICATIONS

"ADC Active Seed Depth Control," Dawn Equipment Company, 2017 (8 pages) http:/dawnequipment.com/depth-control.html.

(Continued)

*Primary Examiner* — Alicia Torres
(74) *Attorney, Agent, or Firm* — Rebecca Henkel; Peter K. Zacharias; Rickard D. DeMille (57) ABSTRACT

A row unit for a seed-planting implement includes a frame, a gauge wheel arm pivotably coupled to the frame, and a gauge wheel rotatably coupled to the gauge wheel arm. Additionally, the row unit includes a wobble bracket configured to engage the gauge wheel arm and a linkage arm coupled to the wobble bracket. Moreover, the row unit includes an actuator, a gearbox coupled to the actuator, and a threaded shaft coupled to the gearbox. In addition, the row unit includes an actuation arm having a first end and a second end opposed to the first end, with the first end forming a hook that directly couples to the linkage arm and the second end coupled to the threaded shaft such that the actuation arm transmits rotation of the threaded shaft into linear motion of the linkage arm.

18 Claims, 7 Drawing Sheets

(56) References Cited

U.S. PATENT DOCUMENTS

| | | | |
|---|---|---|---|
| 4,373,456 A * | 2/1983 | Westerfield | A01C 7/203 111/164 |
| 4,413,685 A | 11/1983 | Gremelspacher et al. | |
| 5,235,922 A * | 8/1993 | Deckler | A01C 5/064 172/395 |
| 6,164,385 A | 12/2000 | Buchl | |
| 6,701,857 B1 | 3/2004 | Jensen et al. | |
| 6,827,029 B1 * | 12/2004 | Wendte | A01C 7/042 111/185 |
| 7,946,232 B2 * | 5/2011 | Patwardhan | A01C 7/203 111/135 |
| 9,357,692 B2 * | 6/2016 | Johnson | A01C 5/064 |
| 9,462,744 B2 | 10/2016 | Isaacson | |
| 9,723,778 B2 * | 8/2017 | Bassett | A01C 5/06 |
| 9,788,473 B2 | 10/2017 | Tobin et al. | |
| 9,918,427 B2 | 3/2018 | Anderson et al. | |
| 9,943,029 B2 | 4/2018 | Burk et al. | |
| 10,080,323 B2 | 9/2018 | Lund et al. | |
| 10,362,726 B2 | 7/2019 | Zielke | |
| 10,412,881 B1 | 9/2019 | Houck | |
| 10,462,956 B2 | 11/2019 | Hamilton | |
| 10,477,753 B2 | 11/2019 | Achen et al. | |
| 10,537,055 B2 | 1/2020 | Gresch et al. | |
| 10,542,666 B2 | 1/2020 | Connell et al. | |
| 10,548,260 B2 | 2/2020 | Bassett | |
| 10,588,252 B2 | 3/2020 | Adams et al. | |
| 10,609,857 B2 | 4/2020 | Sauder et al. | |
| 10,743,455 B2 | 8/2020 | Sloneker et al. | |
| 10,779,454 B2 | 9/2020 | Papke et al. | |
| 10,820,465 B2 | 11/2020 | Kowalchuk et al. | |
| 10,827,663 B2 | 11/2020 | Gresch et al. | |
| 10,882,065 B2 | 1/2021 | Davis et al. | |
| 10,912,250 B2 | 2/2021 | Biery, II et al. | |
| 11,019,762 B2 | 6/2021 | Wright et al. | |
| 11,051,446 B2 | 7/2021 | Antich | |
| 11,191,209 B2 | 12/2021 | Welz et al. | |
| 2003/0016029 A1 | 1/2003 | Schuler et al. | |
| 2011/0282556 A1 | 11/2011 | Klenz et al. | |
| 2020/0337199 A1 | 10/2020 | Hertzog et al. | |
| 2020/0375081 A1 | 12/2020 | Holoubek | |
| 2021/0015025 A1 | 1/2021 | Moiddin et al. | |

FOREIGN PATENT DOCUMENTS

| | | |
|---|---|---|
| WO | WO2019157521 | 8/2019 |
| WO | WO2021064515 | 4/2021 |

OTHER PUBLICATIONS

"Graham Force," Graham Planter, 2021 (2 pages) https://grahamelectricplanter.com/products/product/smartdepth.

"SmartDepth," Precision Planting, (10 pages) https://www.precisionplanting.com/products/product/smartdepth.

"Precision Planting Announces SmartDepth," Precision Planting, Jan. 16, 2019, (1 pages) https://www.precisionplanting.com/agronomy/news/precision-planting-announces-smartdepth.

"Row Unit Operation," Service School (RU113d), J&S Repair, 2004, 116 pages, Retrieved from: https://www.isrepair.com/pdf/kinze/Kinze%20Row%20Unit%201999-2005.pdf.

* cited by examiner

ROW UNIT FOR A SEED-PLANTING IMPLEMENT HAVING A FURROW DEPTH ADJUSTMENT SYSTEM

FIELD OF THE INVENTION

The present disclosure generally relates to seed-planting implements and, more particularly, to a row unit for a seed-planting implement having a furrow depth adjustment system.

BACKGROUND OF THE INVENTION

Modern farming practices strive to increase yields of agricultural fields. In this respect, seed-planting implements are towed behind a tractor or other agricultural vehicle to disperse seed throughout a field. For example, seed-planting implements typically include one or more furrow-forming tools or openers that excavate a furrow or trench in the soil. One or more dispensing devices of the seed-planting implements may, in turn, deposit the seeds into the furrow(s). After deposition of the seeds, a closing assembly may close the furrow in the soil, such as by pushing the excavated soil into the furrow.

The desired depth of the furrow can vary depending on various parameters associated with the field. For example, the desired depth of the furrow varies depending on the soil moisture content of the field. In this respect, furrow depth adjustment systems for seed-planting implements have been developed. While such systems work well, further improvements are needed.

Accordingly, an improved furrow depth adjustment system for a seed-planting implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a row unit for a seed-planting implement. The row unit includes a frame and a disk opener rotatably coupled to the frame, with the disk opener configured to form a furrow within a field across which the seed-planting implement is traveling. Furthermore, the row unit includes a gauge wheel arm pivotably coupled to the frame and a gauge wheel rotatably coupled to the gauge wheel arm, with the gauge wheel configured to roll along a surface of the field. Additionally, the row unit includes a wobble bracket configured to engage the gauge wheel arm and a linkage arm coupled to the wobble bracket. Moreover, the row unit includes an actuator configured to move the linkage arm relative to the frame in a manner that adjusts a position of the gauge wheel relative to the frame, a gearbox coupled to the actuator, and a threaded shaft coupled to the gearbox. In addition, the row unit includes an actuation arm having a first end and a second end opposed to the first end, with the first end forming a hook that directly couples to the linkage arm and the second end coupled to the threaded shaft such that the actuation arm transmits rotation of the threaded shaft into linear motion of the linkage arm.

In another aspect, the present subject matter is directed to seed-planting implement. The seed-planting implement includes a toolbar and a plurality of row units coupled to the toolbar. Each row unit includes a frame and a disk opener rotatably coupled to the frame, with the disk opener configured to form a furrow within a field across which the seed-planting implement is traveling. Furthermore, each row unit includes a gauge wheel arm pivotably coupled to the frame and a gauge wheel rotatably coupled to the gauge wheel arm, with the gauge wheel configured to roll along a surface of the field. Additionally, each row unit includes a wobble bracket configured to engage the gauge wheel arm and a linkage arm coupled to the wobble bracket. Moreover, each row unit includes an actuator configured to move the linkage arm relative to the frame in a manner that adjusts a position of the gauge wheel relative to the frame, a gearbox coupled to the actuator, and a threaded shaft coupled to the gearbox. In addition, each row unit includes an actuation arm having a first end and a second end opposed to the first end, with the first end forming a hook that directly couples to the linkage arm and the second end coupled to the threaded shaft such that the actuation arm transmits rotation of the threaded shaft into linear motion of the linkage arm.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a row unit for a seed-planting implement having a furrow depth adjustment system. More specifically, the row unit includes a frame and one or more disk openers rotatably coupled to the frame. Furthermore, the row unit includes one or more gauge wheels pivotably coupled to the frame via an associated gauge wheel arm(s). In this respect, as the seed-planting implement travels across the field, the disk opener(s) forms a furrow in the soil, while the gauge wheel(s) rolls along the surface and the field. The positioning of the gauge wheel(s) relative to the frame sets the depth of the furrow.

The furrow depth adjustment system includes various components that facilitate pivoting of the gauge wheel arm(s) relative to the frame, thereby allowing for adjustment of the furrow depth. Specifically, in several embodiments, the furrow depth adjustment system includes a wobble bracket configured to engage the gauge wheel arm(s) and a linkage arm coupled to the wobble bracket. For example, in one embodiment, the linkage arm includes a first side wall member, a second side wall member spaced apart from the first side wall member in a wide-wise direction, and a connection rod coupled between the first and second side wall members.

Additionally, the furrow depth adjustment system includes an actuator (e.g., an electric motor), a gearbox coupled to the actuator, and a threaded shaft coupled to the gearbox.

Moreover, an actuation arm is coupled between the threaded shaft and the linkage arm. In this respect, a hook formed at a first end of the actuation arm directly couples to the linkage arm. For example, the hook may directly couple to the connection rod of the linkage arm by wrapping around a portion of the outer surface of the connection rod. Conversely, an opposed, second end of the actuation arm is coupled to the threaded shaft. For example, in one embodiment, the second end may define a threaded passage extending therethrough. In such an embodiment, the threaded shaft threadingly engages the actuation arm via the threaded passage such that rotation of the threaded shaft causes linear movement of the actuation arm.

In operation, the furrow depth adjustment system is configured to adjust the depth of the furrow being formed by the row unit. More specifically, to make an adjustment to the furrow depth, the actuator is operated to rotate the threaded shaft via the gearbox. The actuation arm then converts the rotational movement of the threaded rod into linear movement of the linkage arm. The linear movement of the linkage arm, in turn, causes linear movement of the wobble bracket. Such movement of the wobble bracket pivots the gauge wheel arm(s) relative to the frame, thereby adjusting the position of the gauge wheel(s) relative to the frame.

The actuation arm improves the operation of the row unit. More specifically, many row units include a handle assembly that allows an operator to manually adjust the position of the gauge wheel(s) relative to the frame. In this respect, the handle assembly may be coupled to the connection rod of the linkage arm. However, the hook of the actuation arm can be coupled directly to the connection rod in place of the handle assembly, thereby allowing the actuator/gearbox/threaded rod assembly to move the linkage assembly to automatically adjust the furrow depth. Thus, the actuation arm allows for the installation of an actuator (e.g., an electric motor) on a row unit designed for manual actuation via a handle assembly without the need to redesign the linkage arm, the wobble bracket, the gauge wheel arm(s), or the frame. Additionally, the actuation arm allows for a row unit having a handle assembly for manual furrow depth adjustment to be retrofitted with an actuator/gearbox/threaded rod assembly.

Figure 1:
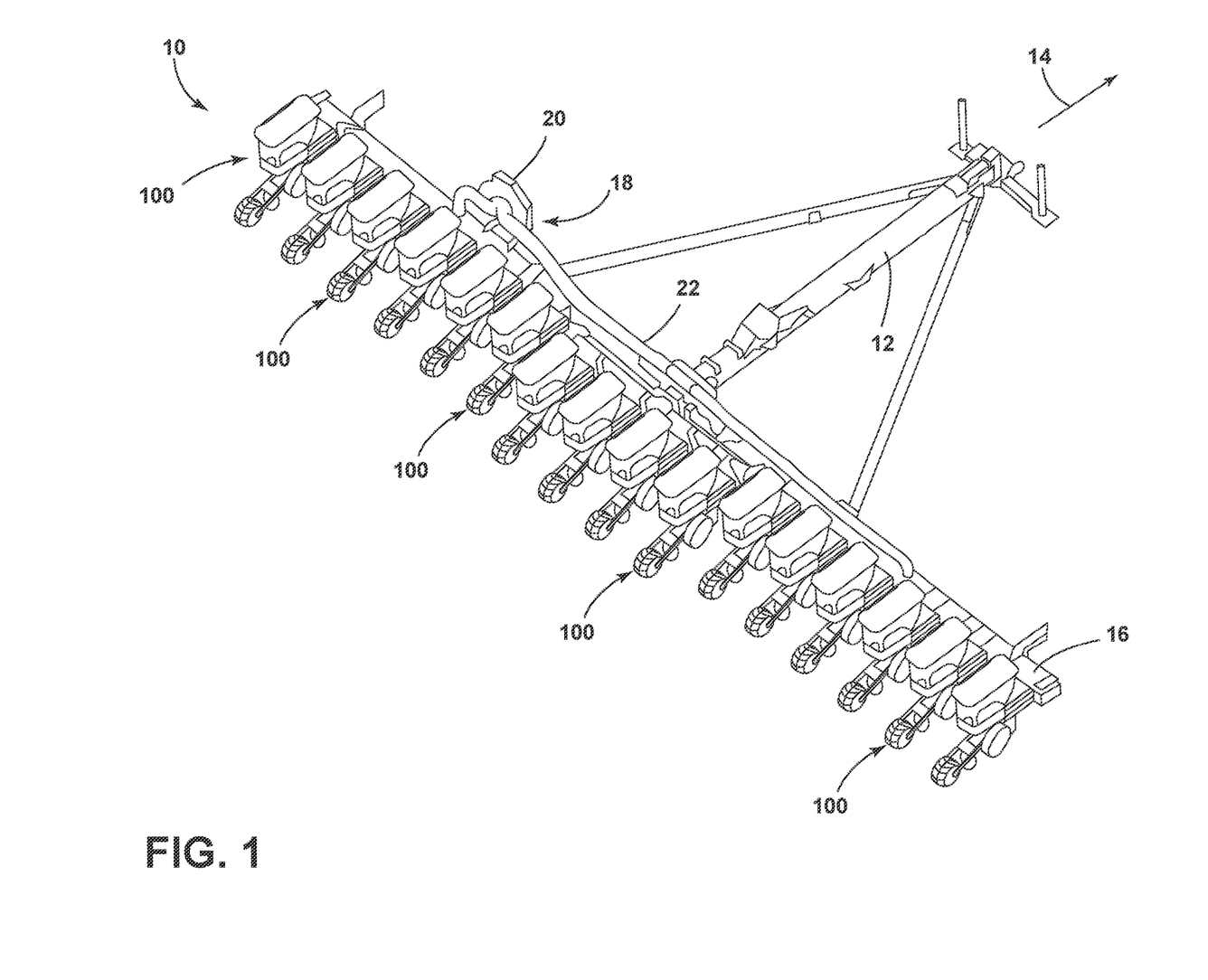
FIG. 1 illustrates a perspective view of one embodiment of a seed-planting in accordance with aspects of the present subject matter.

Referring now to the drawings, FIG. 1 illustrates a perspective view of one embodiment of a seed-planting implement 10 in accordance with aspects of the present subject matter. In the illustrated embodiment, the seed-planting implement 10 is configured as a planter. However, in alternative embodiments, the seed-planting implement 10 may generally correspond to any suitable seed-planting equipment or implement, such as seeder or another seed-dispensing implement.

As shown in FIG. 1, the seed-planting implement 10 includes a tow bar 12. In general, the tow bar 12 is configured to couple to a tractor or other agricultural vehicle (not shown), such as via a suitable hitch assembly (not shown). In this respect, the tractor may tow the seed-planting implement 10 across a field in a direction of travel (indicated by arrow 14) to perform a seed-planting operation on the field.

Furthermore, the seed-planting implement 10 includes a toolbar 16 coupled to an aft end of the tow bar 12. More specifically, the toolbar 16 is configured to support and/or couple to one or more components of the seed-planting implement 10. For example, the toolbar 16 is configured to support a plurality of seed-planting units or row units 100. As will be described below, each row unit 100 is configured to form a furrow having a desired depth within the soil of a field. Thereafter, each row unit 100 deposit seeds within the corresponding furrow and subsequently closes the corresponding furrow after the seeds have been deposited, thereby establishing rows of planted seeds.

In general, the seed-planting implement 10 may include any number of row units 100. For example, in the illustrated embodiment, the seed-planting implement 10 includes sixteen row units 100 coupled to the toolbar 16. However, in other embodiments, the seed-planting implement 10 may include six, eight, twelve, twenty-four, thirty-two, or thirty-six row units 100.

Additionally, in some embodiments, the seed-planting implement 10 includes a pneumatic distribution system 18. In general, the pneumatic distribution system 18 is configured to distribute seeds from a bulk storage tank (not shown) to the individual row units 100. As such, the pneumatic distribution system 18 may include a fan or other pressurized air source 20 and a plurality of seed conduits 22 extending between the fan 20 and the row units 100. In this respect, the pressurized air generated by the fan 20 conveys the seeds from the bulk storage tank through the seed conduits 22 to the individual row units 100. However, the seeds may be provided to the row units 100 in any other suitable manner.

It should be further appreciated that the configuration of the seed-planting implement 10 described above and shown in FIG. 1 is provided only to place the present subject matter in an exemplary field of use. Thus, it should be appreciated that the present subject matter may be readily adaptable to any manner of seed-planting implement configuration.

Figure 2:
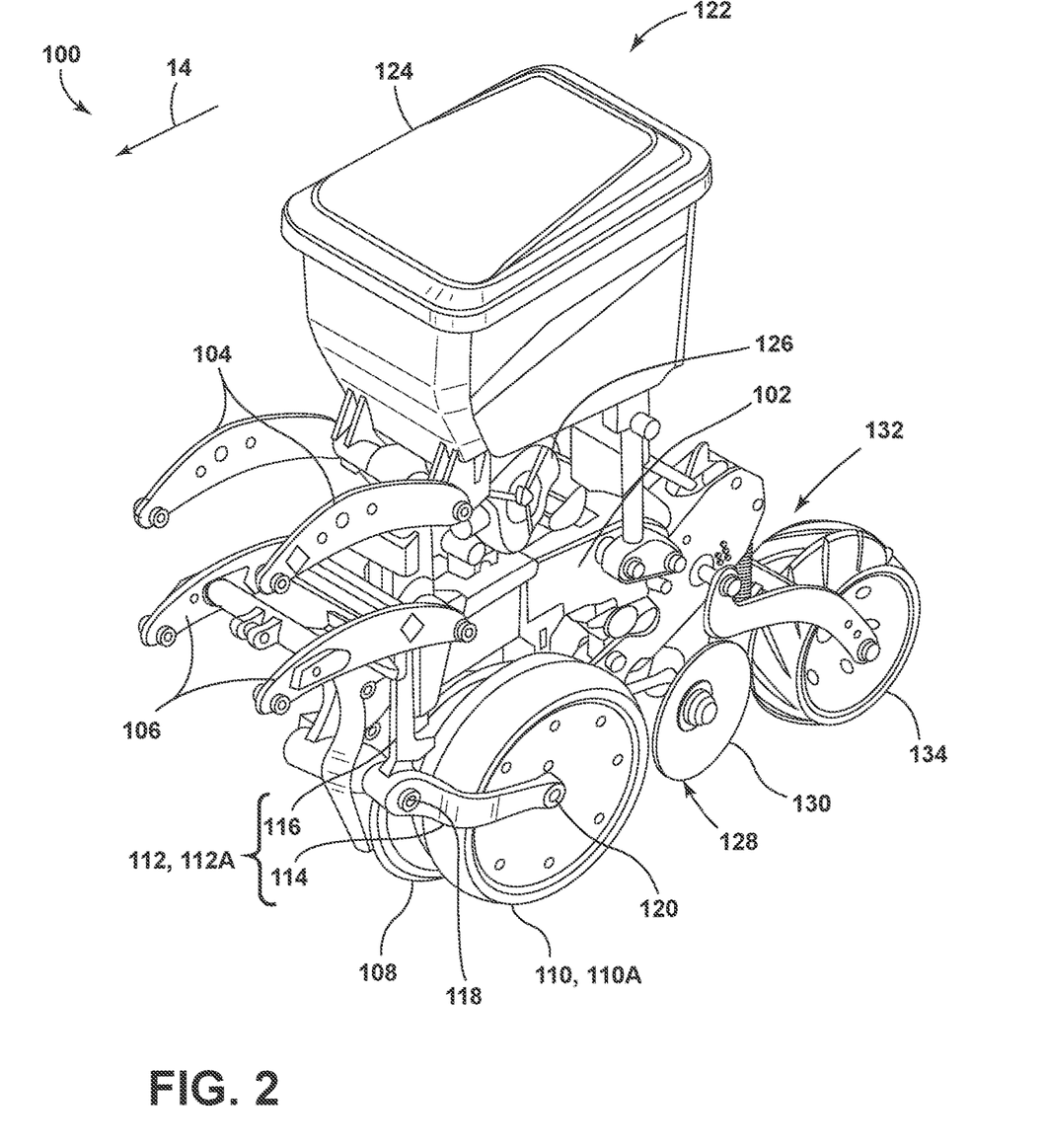
FIG. 2 illustrates a perspective view of one embodiment of a row unit for a seed-planting in accordance with aspects of the present subject matter.

Referring now to FIG. 2, a perspective view of one embodiment of a row unit 100 for a seed-planting implement is illustrated in accordance with aspects of the present subject matter. In general, the row unit 100 will be described herein with reference to the seed-planting implement 10 described above with reference to FIG. 1. However, it should be appreciated by those of ordinary skill in the art that the disclosed row unit 100 may generally be utilized with seed-planting implements having any other suitable implement configuration.

As shown, the row unit 100 may include a frame 102 adjustably coupled to the toolbar 16 by upper and lower links 104, 106. For example, one end of each link 104, 106 may be pivotably coupled to the frame 102 of the row unit 100. Conversely, an opposed end of each link 104, 106 may be pivotably coupled to the toolbar 16. As such, the links 104, 106 may allow for adjustment of the vertical position of the row unit 100 relative to the toolbar 16. However, in alternative embodiments, the row unit 100 may be coupled to the toolbar 16 in any other suitable manner.

Moreover, the row unit 100 includes one or more disk openers 108 rotatably coupled to the frame 102. In general, the disk opener(s) 108 is configured to form a furrow within a field across which the seed-planting implement 10 is traveling. For example, the disk opener(s) 108 penetrates into the soil of the field to a desired furrow depth and rotates relative to the soil as the seed-planting implement 10 moves across the field in the direction of travel 14, thereby forming a furrow.

In addition, the row unit 100 includes one or more gauge wheels 110 adjustably coupled to the frame 102 via a gauge wheel arm(s) 112. In general, the gauge wheel(s) 110 is configured to set the penetration depth of the disk opener(s) 108. More specifically, as the seed-planting implement 10 moves across the field in the direction of travel 14, the gauge wheel(s) 110 rolls along the surface of the field. In this respect, the positioning of the gauge wheel(s) 110 relative to the frame 102 sets the depth to which the disk opener(s) 108 penetrate the soil and, thus, the depth of the furrow being formed by the row unit 100.

In several embodiments, the gauge wheel(s) 110 may be rotatably coupled to the gauge wheel arm(s) 112, with the gauge wheel arm(s) 112 being pivotably coupled to the frame 102. For example, in one embodiment, each gauge wheel arm 112 includes a lower arm portion 114 pivotably coupled to the frame 102 at one end thereof via a corresponding pivot joint 118. Furthermore, each gauge wheel 110 is rotatably coupled to the lower arm portion 114 of one of the gauge wheel arms 112 at an opposed end thereof via a corresponding pivot joint 120. In addition, each gauge wheel arm 112 includes an upper arm portion 116 extending generally upward from the lower arm portion 114. As will be described below, the upper arm portion(s) 116 may engage a furrow depth adjustment system 200 such that the relative positioning of the gauge wheel(s) 110 and the frame 102 can be adjusted.

Furthermore, the row unit 100 includes a seed-dispensing system 122 supported on the frame 102. In general, the seed-dispensing system 122 is configured to deposit seeds into the furrow formed by the disk opener(s) 108 such that the seeds are spaced apart from each other within the furrow by a predetermined distance. For example, in one embodiment, the seed-dispensing system 122 includes a hopper 124 coupled to the frame 102 configured to store seeds. In some embodiments, the hopper 124 may receive seeds from the bulk storage tank via the pneumatic distribution system 18. In addition, the seed-dispensing system 122 may include a seed meter 126 configured to meter or otherwise dispense seeds from the hopper 124 into a seed tube (not shown) at a predetermined rate. The seeds then fall through the seed tube and into the furrow such that the seeds are spaced apart by the predetermined distance.

Additionally, in several embodiments, the row unit 100 may include a closing assembly 128 supported on the frame 102 aft of the disk opener(s) 108 and the seed tube relative to the direction of travel 14. Specifically, in one embodiment, the furrow closing assembly 128 may include a pair of closing disks 130 (only one of which is shown) positioned relative to each other such that soil flows between the disks 130 as the seed-planting implement 10 travels across the field. In this respect, the closing disks 130 are configured to close the furrow after seeds have been deposited therein, such as by collapsing the excavated soil into the furrow.

Moreover, in some embodiments, the row unit 100 may include a press wheel assembly 132 supported on the frame 102 aft of the closing assembly 128 relative to the direction of travel 14. Specifically, in several embodiments, the press wheel assembly 56 may include a press wheel 134 configured to roll over the closed furrow to firm the soil over the seed and promote favorable seed-to-soil contact.

Figure 3:
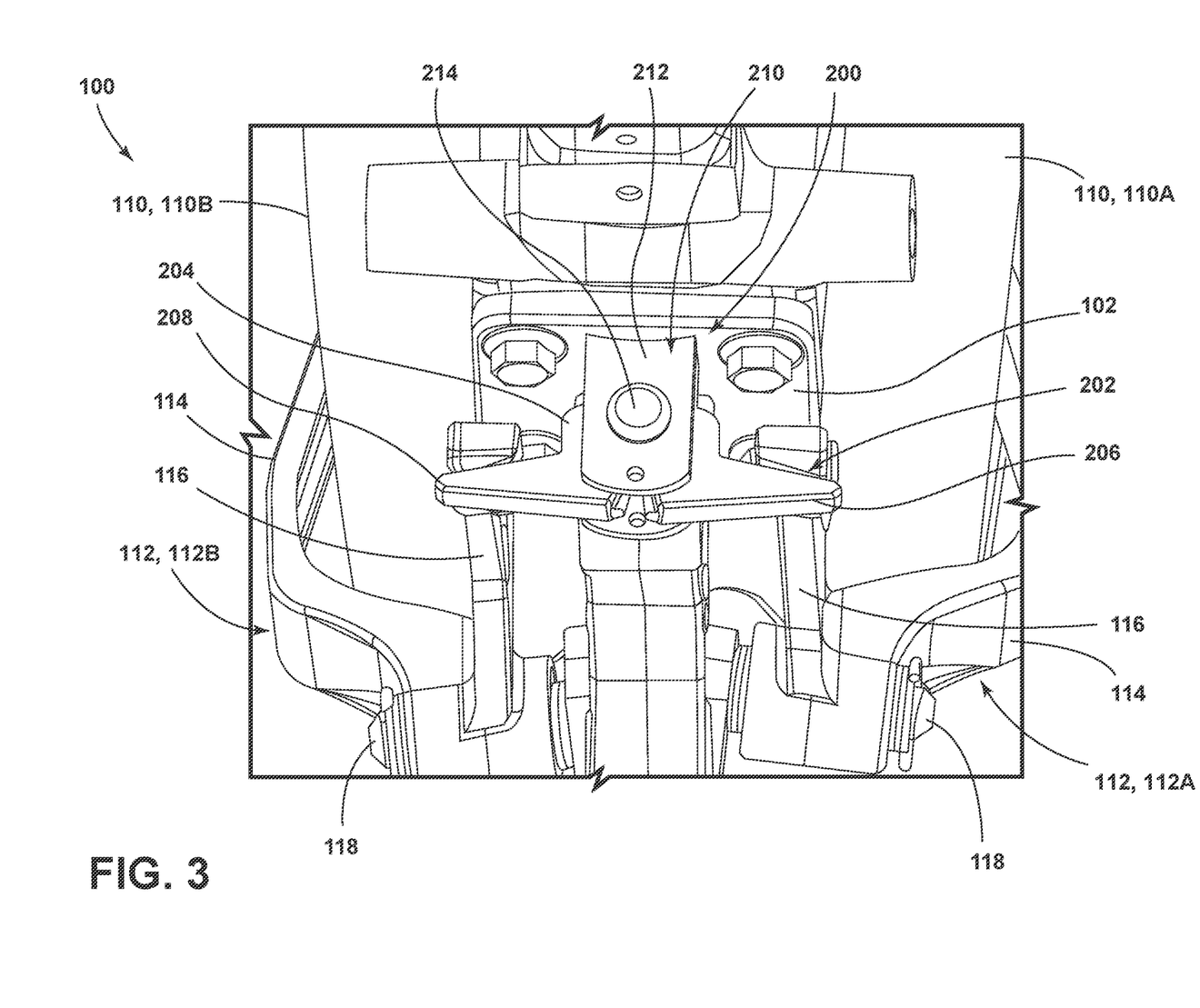
FIG. 3 illustrates a partial, front view of one embodiment of a row unit for a seed-planting implement in accordance with aspects of the present subject matter, particularly illustrating a pair of gauge wheel arms of the row unit.

FIG. 3 illustrates a partial, front view of the row unit 100. As mentioned above, the row unit 100 includes one or more gauge wheels 110 adjustably coupled to the frame 102 of the row unit 100 via a gauge wheel arm(s) 112. For example, in the illustrated embodiment, the row unit 100 includes a first gauge wheel 110A adjustably coupled to the frame 102 via a first gauge wheel arm 112A and a second gauge wheel 110B adjustably coupled to the frame 102 via a second gauge wheel arm 112B. However, in alternative embodiments, the row unit 100 may include any other suitable number of gauge wheels 110 and gauge wheel arms 112, such as a single gauge 110 adjustably coupled to the frame 102 via a single gauge wheel arm 112.

Additionally, as mentioned above, the row unit 100 includes a furrow depth adjustment system 200. In general, the furrow depth adjustment system 200 is configured to adjust the position of the gauge wheel(s) 110 relative to the frame 102, thereby adjusting the depth of the furrow being formed by the row unit 100. Specifically, as will be described below, the furrow depth adjustment system 200 is configured to pivot the gauge wheel arm(s) 112 relative to the frame 102 to make such adjustments.

In several embodiments, the furrow depth adjustment system 200 includes a wobble bracket 202. In general, the wobble bracket 202 is configured to engage gauge wheel arm(s) 112. For example, the wobble bracket 202 may be in direct contact with the upper arm portion(s) 116 of the gauge wheel arm(s) 112. As such, linear movement of the wobble bracket 202 causes the gauge wheel arm(s) 112 to pivot relative to the frame 102 about the pivot joint(s) 118.

The wobble bracket 202 may have any suitable configuration that allows the wobble bracket 202 to engage with the gauge wheel arm(s) 112 in manner that allows for pivoting of the gauge wheel arm(s) 112. For example, in the illustrated embodiment, the wobble bracket 202 includes a base portion 204 and first and second arms 206, 208 extending outward from the base portion 204 in a direction generally perpendicular to the direction of travel 14. In this respect, the first arm 206 of the wobble bracket 202 is in contact with the upper arm portion 116 of the first gauge wheel arm 112A. Similarly, the second arm 208 of the wobble bracket 202 is in contact with the upper arm portion 116 of the second gauge wheel arm 112B. As such, linear movement of the wobble bracket 202 simultaneously pivots the first and second gauge wheel arms 112A, 112B relative to the frame 102 about the corresponding pivot joints 118.

Moreover, the furrow depth adjustment system 200 includes a linkage arm 210 coupled to the wobble bracket 202. In this respect, the linkage arm 210 is configured to linearly move the wobble bracket 202 relative to the frame 102 to pivot the gauge wheel arm(s) 112. For example, in one embodiment, the linkage arm 210 includes a clevis portion 212 configured to receive the base portion 204 of the wobble bracket 202. Furthermore, in such an embodiment, the clevis portion 212 is pivotably coupled to the base portion 204 of the wobble bracket 202 via a pin 214. The pin 214, in turn, allows the wobble bracket 202 to pivot within the clevis portion 212. However, in alternative embodiments, the linkage arm 210 may be coupled to the wobble bracket 202 in any other suitable manner.

Figure 4:
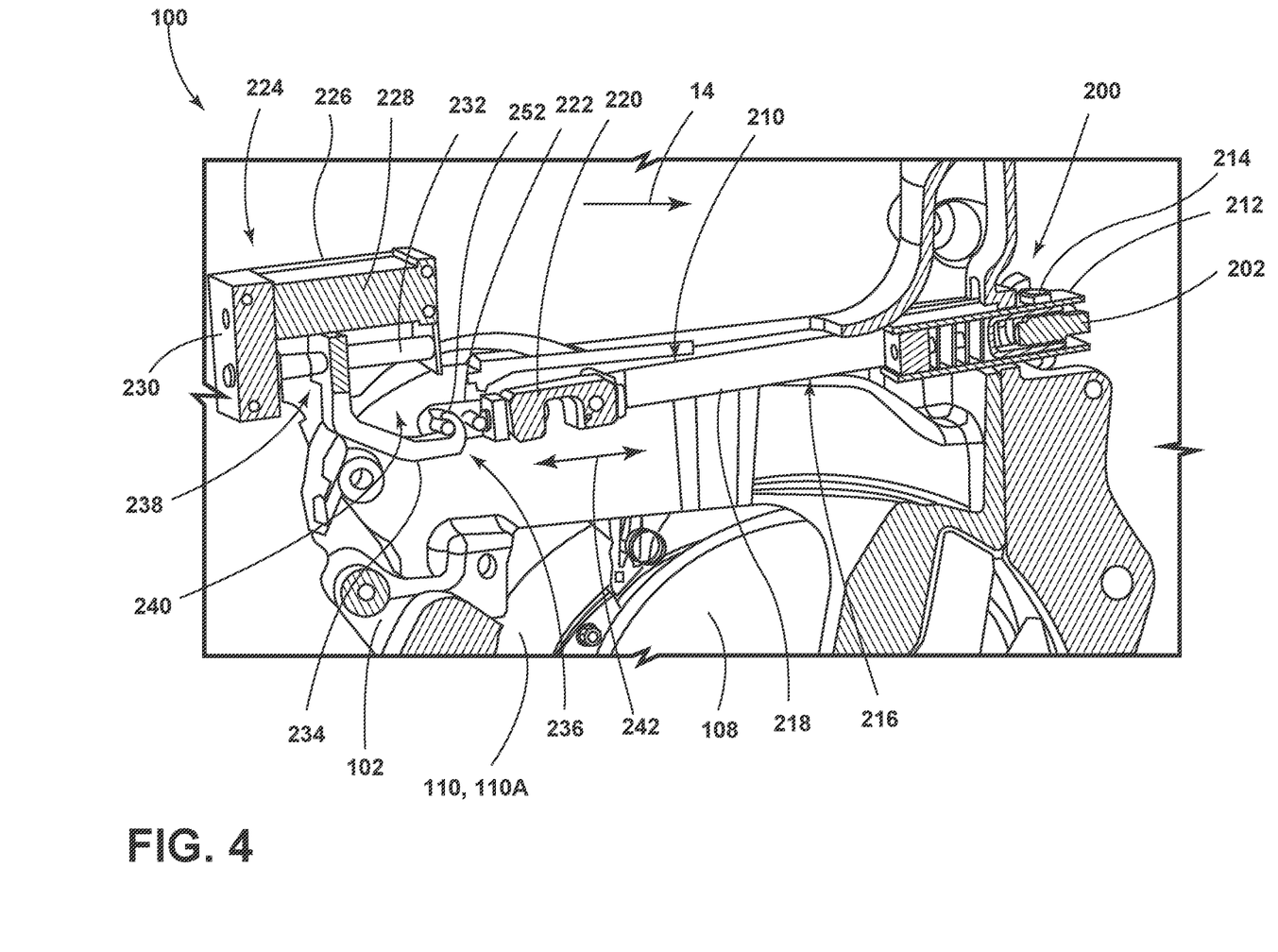
FIG. 4 illustrates a partial cross-sectional view of one embodiment of a row unit for a seed-planting implement in accordance with aspects of the present subject matter, particularly illustrating a furrow depth adjustment system of the row unit.

FIG. 4 illustrates a partial cross-sectional view of the row unit 100. As shown, the wobble bracket 202 is generally positioned at the forward end of the row unit relative to the direction of travel 14. In this respect, the linkage arm 210 generally extends along the length of the row unit 100 (i.e., parallel to the direction of travel 14). As such, the clevis portion 212 of linkage arm 210 is similarly positioned at the forward end of the row unit 100 relative to the direction of travel 14.

The linkage arm 210 may have any suitable construction that allows linear motion to be transmitted along the length of the row unit 100 to the wobble bracket 202. For example, in the illustrated embodiment, the linkage arm 210 includes a center portion 216 coupled to and positioned aft of the clevis portion 212. The center portion 216 of the linkage arm 210 may be formed from a pair of parallel, spaced apart side wall members 218 (one of which is shown). Additionally, in the illustrated embodiment, the linkage arm 210 includes a coupling block 220 coupled to (e.g., threadingly) and positioned aft of the center portion 216. Moreover, in the illustrated embodiment, the linkage arm 210 includes a rear portion 222 coupled to (e.g., threadingly) and positioned aft of the coupling block 220.

In addition, the furrow depth adjustment system 200 includes an actuator assembly 224 supported on the frame 102 of the row unit 100. In general, the actuator assembly 224 is configured to linearly move the linkage arm 210 and the wobble bracket 202 to pivot the gauge wheel arm(s) 112 relative to the frame 102. In several embodiments, the actuator assembly 224 includes a housing 226 coupled to the frame 102. The housing 226 may, in turn, be configured to enclose and/or otherwise support one or more components of the actuator assembly 224. Specifically, as shown, the actuator assembly 224 includes an actuator 228 positioned within the housing 226. As will be described below, the actuator 228 (e.g., an electric motor) is configured to generate the motion necessary to move the linkage arm 210. Moreover, the actuator assembly 224 includes a gearbox or transmission 230 coupled to the actuator 228. Additionally, the actuator assembly 224 includes a threaded shaft 232 coupled to the gearbox 230. In this respect, the gearbox 230 converts rotation generated by the actuator 228 into rotation of the threaded shaft 232 (e.g., at a different speed and/or with a different torque amount). Such rotation of the threaded shaft, in turn, causes the linkage arm 210 to linearly move (e.g., as indicated by arrow 242) in a manner that pivots the gauge wheel arm(s) 112.

In general, the actuator assembly 224 is positioned adjacent to the aft end of the row unit 100 relative to the direction of travel 14. For example, as shown, the actuator assembly 224 may be positioned adjacent to a depth-setting register 240 defined by the frame 102 of the row unit 100. As will be described below, the depth-setting register 240 may be formed within the frame 102 to allow for manual furrow depth adjustments.

Furthermore, the furrow depth adjustment system 200 includes an actuation arm 234 having a first end 236 and an opposed, second end 238. In general, the actuation arm 234 is coupled to the linkage arm 210 at its first end 236 and to the threaded shaft 232 at its second end 238. As such, the actuation arm 234 may generally define an arcuate shape to permit such coupling. In this respect, the actuation arm 234 is configured to convert or otherwise transmit rotation of the threaded shaft 232 into linear movement of the linkage arm 210.

Figure 5:
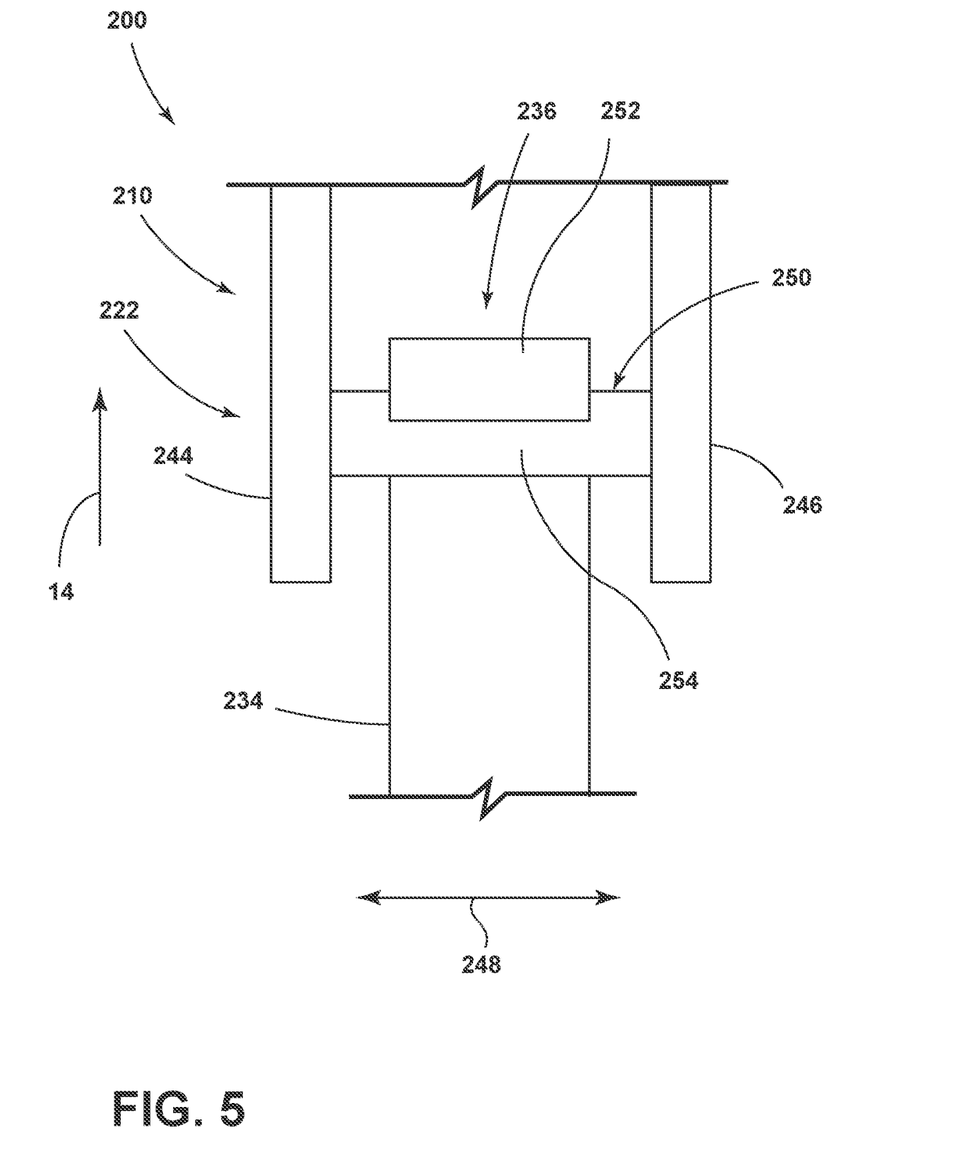
FIG. 5 illustrates a partial top view of one embodiment of a furrow depth adjustment system of a row unit for a seed-planting implement in accordance with aspects of the present subject matter, particularly illustrating an actuation arm directly coupled to a linkage arm.

Referring now to FIGS. 4 and 5, in several embodiments, the first end 236 of the actuation arm 234 is coupled to the rear portion 222 of the linkage arm 210. Specifically, in such embodiments, the rear portion 222 of the linkage arm 210 includes first and second side wall members 244, 246 spaced apart from each other in a width-wise direction (indicated by arrow 248 in FIG. 5) of the linkage arm 210. The width-wise direction 248, in turn, generally extends perpendicular to the direction of travel 14. Moreover, the rear portion 222 of the linkage arm 210 includes a connection rod 250 extending with the width-wise direction 248 between the first and second side wall members 244, 246 to couple the first and second side wall members 244, 246 together. As will be described below, the first end 236 of the actuation arm 234 may directly couple to the connection rod 250.

As shown, the first end 236 of the actuation arm 234 forms a hook 252 that directly couples to the linkage arm 210. Specifically, in several embodiments, the hook 252 of the actuation arm 234 is directly coupled to the connection rod 250. For example, in some embodiments, the hook 252 wraps around a portion of an outer surface 254 of the connection rod 250 such that the hook 252 is in direct contact with the outer surface 254 of the connection rod 250. In this respect, the hook 252 (and the first end 236 of the actuation arm 234 in general) may be positioned between the first and second side wall members 244, 246 of the linkage arm 210 in the width-wise direction 248.

Figure 6:
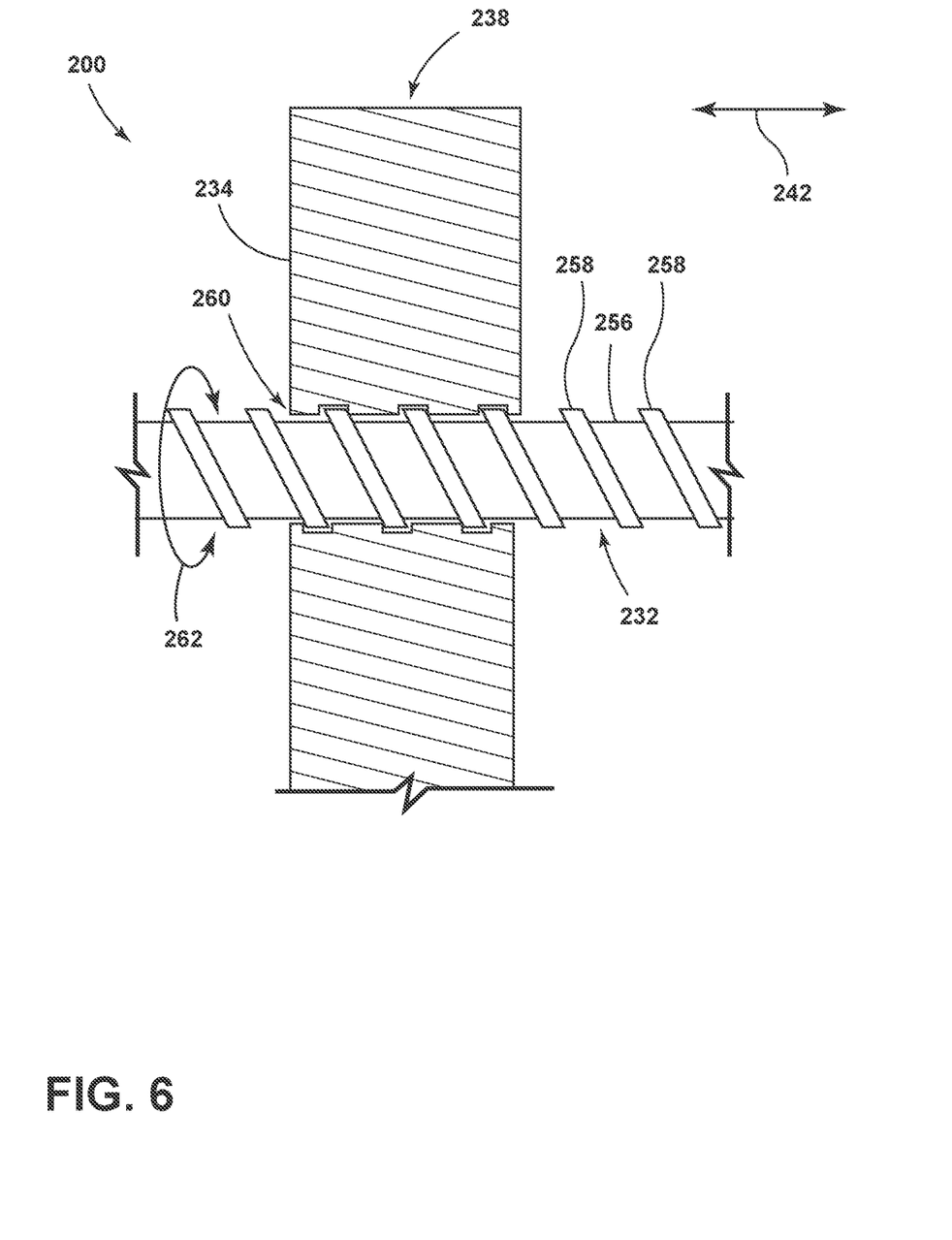
FIG. 6 illustrates a partial cross-sectional view of a furrow depth adjustment system of a row unit for a seed-planting implement in accordance with aspects of the present subject matter, particularly illustrating an actuation arm threadingly engaged with a threaded rod.

Referring now to FIG. 6, as mentioned above, the second end 238 of the actuation arm 234 is coupled to the threaded shaft 232. More specifically, the threaded shaft 232 includes a shaft body 256 having threads 258 extending helically around the shaft body 256. For example, in some embodiment, the threads 258 are configured as acme threads. However, in other embodiments, any other suitable type of threads may be used. Moreover, the second end 238 of the actuation arm 234 may define a threaded passage 260 extending therethrough. As such, the threaded shaft 232 may threadingly engage the threaded passage 260 of the actuation arm 234. In this respect, rotation of the threaded shaft 232 (indicated by arrow 262 in FIG. 6) may cause linear motion of the actuation arm 234 and the linkage arm 210 (indicated by the arrow 242).

Figure 7:
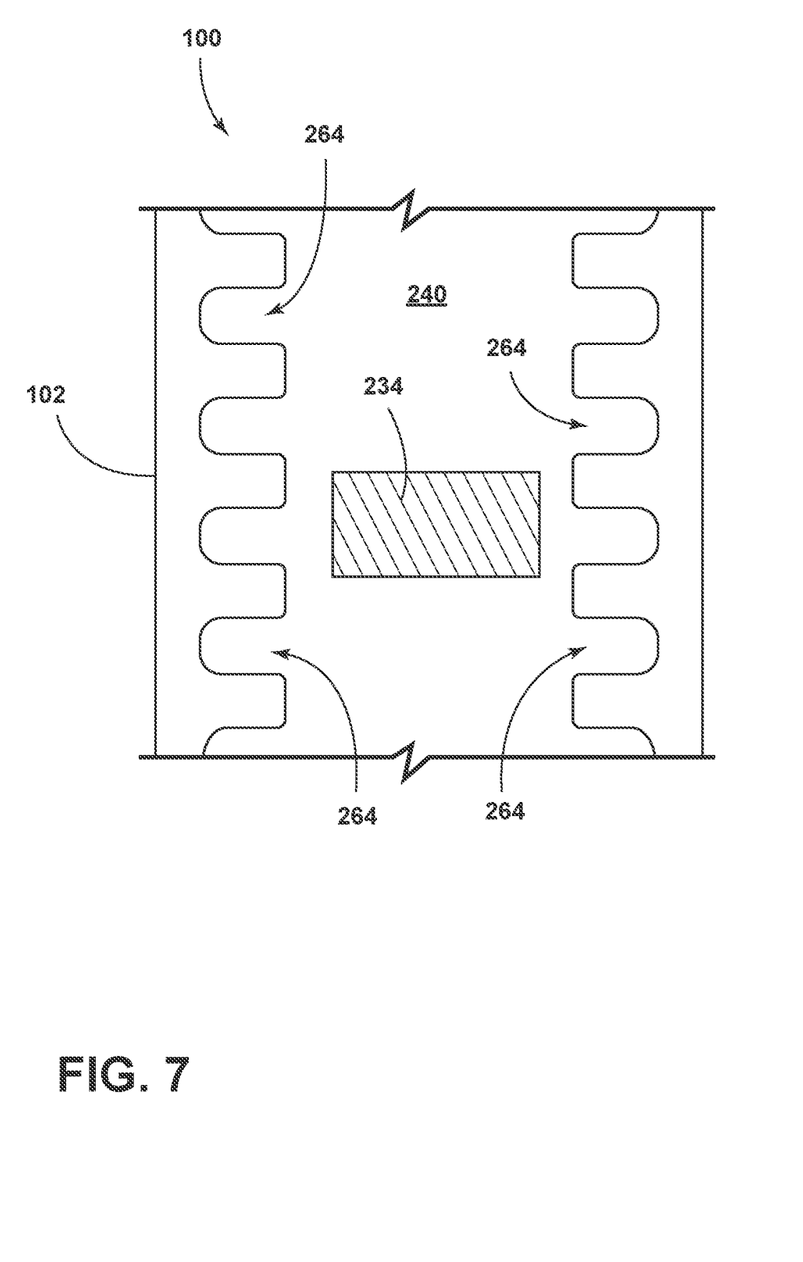
FIG. 7 illustrates a partial cross-sectional view of a furrow depth adjustment system of a row unit for a seed-planting in accordance with aspects of the present subject matter, particularly illustrating an actuation arm extending through a depth-setting register defined by a frame of the row unit.

As shown in FIG. 7, the actuation arm 234 may extend through the depth-setting register 240 of the row unit 100. More specifically, as mentioned above, the rear portion of the frame 102 of the row unit 100 may define the depth-setting register 240 used to manually adjust the depth of the furrow being formed by the row unit 100. For example, in some furrow depth adjustment systems, a handle assembly (not shown) may be coupled to the linkage arm 210. As such, the depth-setting register 240 may include a plurality of depth detents 264 into which the handle assembly can be manually positioned by an operator. However, with the furrow depth adjustment system 200 disclosed herein, the handle assembly is removed and replaced with the actuator assembly 224 to allow for automatic adjustment of the furrow depth. In this respect, the actuation arm 234 may extend through the depth-setting register 240 of the frame 102 to couple the threaded shaft 232 of the actuator assembly 224 to linkage arm 210. As will be described below, such a configuration eliminates the need to redesign the frame 102 when installing the actuator assembly 224.

As indicated above, the furrow depth adjustment system 200 is configured to automatically adjust the depth of the furrow being formed by the row unit 100 by adjusting the position of the gauge wheel(s) 110 relative to the frame 102. More specifically, and as best illustrated in FIG. 4, to adjust the furrow depth, the actuator 228 rotates the threaded shaft 232 via the gearbox 230. The actuation arm 234 converts the rotation of the threaded shaft 232 into linear movement of the linkage arm 210 and the wobble bracket 202. The linear movement of the wobble bracket 202, in turn, pivots the gauge wheel arm(s) 112 about the pivot joint(s) 118 relative to the frame 102 of the row unit 100. Such pivoting of the gauge wheel arm(s) 112 relative to the frame 102 adjusts the position of the gauge wheel(s) 110 relative to the frame 102, thereby adjusting the depth of the furrow being formed by the disk opener(s) 108 of the row unit 100.

The actuation arm 234 improves the operation of the row unit 100. More specifically, many row units include a handle assembly that allows an operator to manually adjust the position of the gauge wheel(s) 110 relative to the frame 102 (e.g., using the depth-setting register 240). In this respect, the handle assembly may be coupled to the connection rod 250 of the linkage arm 210. However, the hook 252 of the actuation arm 234 can be coupled directly to the connection rod 250 in place of the handle assembly, thereby allowing the actuator assembly 224 to move the linkage arm 210 to automatically adjust the furrow depth. Moreover, the actuation arm 234 generally extends through the depth-setting register 240. Thus, the actuation arm 234 allows for the installation of the actuator assembly 224 on the row unit 100, which was initially designed for manual actuation via a handle assembly, without the need to redesign the linkage arm 210, the wobble bracket 202, the gauge wheel arm(s) 112, or the frame 102. Additionally, the actuation arm 234 allows for a row unit having a handle assembly for manual furrow depth adjustment to be retrofitted with the actuator assembly 224.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A row unit for a seed-planting implement, the row unit comprising:
a frame;
a disk opener rotatably coupled to the frame, the disk opener configured to form a furrow within a field across which the seed-planting implement is traveling;
a gauge wheel arm pivotably coupled to the frame;
a gauge wheel rotatably coupled to the gauge wheel arm, the gauge wheel configured to roll along a surface of the field;
a wobble bracket configured to engage the gauge wheel arm;
a linkage arm coupled to the wobble bracket;
an actuator configured to move the linkage arm relative to the frame in a manner that adjusts a position of the gauge wheel relative to the frame;
a gearbox coupled to the actuator;
a threaded shaft coupled to the gearbox; and
an actuation arm including a first end and a second end opposed to the first end, the first end forming a hook that directly couples to the linkage arm, the second end coupled to the threaded shaft such that the actuation arm transmits rotation of the threaded shaft into linear motion of the linkage arm.

2. The row unit of claim 1, wherein the linkage arm comprises:
a first side wall member;
a second side wall member spaced apart from the first side wall member in a width-wise direction of the linkage arm; and
a connection rod extending within the width-wise direction between the first and second side wall members.

3. The row unit of claim 2, wherein the hook is directly coupled to the connection rod.

4. The row unit of claim 3, wherein the hook wraps around a portion of an outer surface of the connection rod.

5. The row unit of claim 4, wherein the hook is positioned between the first and second side wall members in the width-wise direction.

6. The row unit of claim 1, wherein the second end of the actuation arm defines a threaded passage configured to threadingly receive the threaded shaft.

7. The row unit of claim 1, wherein the actuation arm defines an arcuate shape.

8. The row unit of claim 1, wherein the frame defines a depth-setting register including a plurality of depth detents, the actuation arm extending through the depth-setting register.

9. The row unit of claim 1, wherein the gauge wheel arm corresponds to a first gauge wheel arm and the gauge wheel corresponds to a first gauge wheel, the row unit further comprising:
a second gauge wheel arm pivotably coupled to the frame; and
a second gauge wheel rotatably coupled to the second gauge wheel arm, the second gauge wheel configured to roll along the surface of the field,
wherein the wobble bracket is configured to engage the second gauge wheel arm.

10. The row unit of claim 1, further comprising:
a closing assembly positioned aft of the disk opener relative to a direction of travel of the seed-planting implement, the closing assembly configured to close the furrow formed within the field.

11. The row unit of claim 10, further comprising:
a press wheel assembly positioned aft of the closing assembly relative to the direction of travel, the press wheel assembly configured to roll over the closed furrow.

12. A seed-planting implement, comprising:
a toolbar; and
a plurality of row units coupled to the toolbar, each row unit comprising:
- a frame;
- a disk opener rotatably coupled to the frame, the disk opener configured to form a furrow within a field across which the seed-planting implement is traveling;
- a gauge wheel arm pivotably coupled to the frame;
- a gauge wheel rotatably coupled to the gauge wheel arm, the gauge wheel configured to roll along a surface of the field;
- a wobble bracket configured to engage the gauge wheel arm;
- a linkage arm coupled to the wobble bracket;
- an actuator configured to move the linkage arm relative to the frame in a manner that adjusts a position of the gauge wheel relative to the frame;
- a gearbox coupled to the actuator;
- a threaded shaft coupled to the gearbox; and
- an actuation arm including a first end and a second end opposed to the first end, the first end forming a hook that directly couples to the linkage arm, the second end coupled to the threaded shaft such that the actuation arm transmits rotation of the threaded shaft into linear motion of the linkage arm.

13. The seed-planting implement of claim 12, wherein the linkage arm comprises:
- a first side wall member;
- a second side wall member spaced apart from the first side wall member in a width-wise direction of the linkage arm; and
- a connection rod extending within the width-wise direction between the first and second side wall members.

14. The seed-planting implement of claim 13, wherein the hook is directly coupled to the connection rod.

15. The seed-planting implement of claim 14, wherein the hook wraps around a portion of an outer surface of the connection rod.

16. The seed-planting implement of claim 15, wherein the hook is positioned between the first and second side wall members in the width-wise direction.

17. The seed-planting implement of claim 12, wherein the second end of the actuation arm defines a threaded passage configured to threadingly receive the threaded shaft.

18. The seed-planting implement of claim 12, wherein the actuation arm defines an arcuate shape.

* * * * *